United States Patent
Santos et al.

(10) Patent No.: US 11,319,477 B2
(45) Date of Patent: May 3, 2022

(54) BREAKER ADDITIVES FOR EXTENDED DELAY IN REMOVAL OF OIL-BASED FILTER CAKES

(71) Applicant: Halliburton Energy Services, Inc., Houston, TX (US)

(72) Inventors: Catherine Martin Santos, Houston, TX (US); William Walter Shumway, Spring, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 208 days.

(21) Appl. No.: 16/655,119

(22) Filed: Oct. 16, 2019

(65) Prior Publication Data

US 2021/0115320 A1    Apr. 22, 2021

(51) Int. Cl.
  *C09K 8/52* (2006.01)
  *C09K 8/035* (2006.01)

(52) U.S. Cl.
  CPC ............... *C09K 8/52* (2013.01); *C09K 8/035* (2013.01); *C09K 2208/26* (2013.01)

(58) Field of Classification Search
  CPC ...... C09K 8/52; C09K 8/035; C09K 2208/26; Y10S 507/927
  See application file for complete search history.

(56) References Cited

U.S. PATENT DOCUMENTS

| | | | |
|---|---|---|---|
| 5,447,199 A | 9/1995 | Dawson et al. | |
| 7,855,168 B2 | 12/2010 | Fuller et al. | |
| 7,906,464 B2 | 3/2011 | Davidson | |
| 7,935,660 B2 | 5/2011 | Harris et al. | |
| 8,062,997 B2 | 11/2011 | Deville | |
| 8,586,507 B2 | 11/2013 | Deville | |
| 8,881,823 B2 | 11/2014 | Collins et al. | |
| 10,240,427 B2 | 3/2019 | Murphree et al. | |
| 2007/0299142 A1 | 12/2007 | Crews et al. | |
| 2008/0110618 A1 | 5/2008 | Quintero et al. | |
| 2008/0169102 A1* | 7/2008 | Carbajal | C09K 8/52 166/300 |
| 2008/0200354 A1 | 8/2008 | Jones et al. | |

(Continued)

FOREIGN PATENT DOCUMENTS

| | | |
|---|---|---|
| EP | 1833940 | 9/2007 |
| EP | 2721251 | 4/2014 |

(Continued)

OTHER PUBLICATIONS

International Search Report and Written Opinion for Application No. PCT/US2019/060118, dated Jul. 14, 2020.

*Primary Examiner* — Aiqun Li
(74) *Attorney, Agent, or Firm* — Tenley Krueger; C. Tumey Law Group PLLC

(57) ABSTRACT

The present disclosure provides methods, compositions, and systems directed to filter cake removal embodying a delayed breaker fluid for oil-based drill-in fluids. A wellbore treatment method comprising: introducing a delayed breaker fluid into a wellbore, wherein the delayed breaker fluid comprises an aqueous base fluid, an acid precursor, and a carbodiimide; and contacting a filter cake in the wellbore with the delayed breaker fluid such that the filter cake is at least partially degraded by acid released from the acid precursor.

18 Claims, 1 Drawing Sheet

(56) References Cited

U.S. PATENT DOCUMENTS

| | | |
|---|---|---|
| 2008/0227672 A1 | 9/2008 | Crews et al. |
| 2010/0273684 A1 | 10/2010 | Deville |
| 2013/0137610 A1 | 5/2013 | Huang et al. |
| 2013/0213659 A1 | 8/2013 | Luyster et al. |
| 2014/0113843 A1 | 4/2014 | Shumway |
| 2014/0162910 A1 | 6/2014 | Braley et al. |
| 2014/0262274 A1 | 9/2014 | Dismuke et al. |
| 2014/0303047 A1 | 10/2014 | McDaniel et al. |
| 2014/0318788 A1 | 10/2014 | Agrawal et al. |
| 2017/0267912 A1 | 9/2017 | Mekade et al. |
| 2018/0134947 A1 | 5/2018 | Plyashkevich et al. |
| 2019/0016947 A1 | 1/2019 | Mahmoud et al. |
| 2019/0144736 A1 | 5/2019 | Welton |

FOREIGN PATENT DOCUMENTS

| | | |
|---|---|---|
| EP | 2113015 | 1/2016 |
| WO | 2014011587 | 1/2014 |

\* cited by examiner

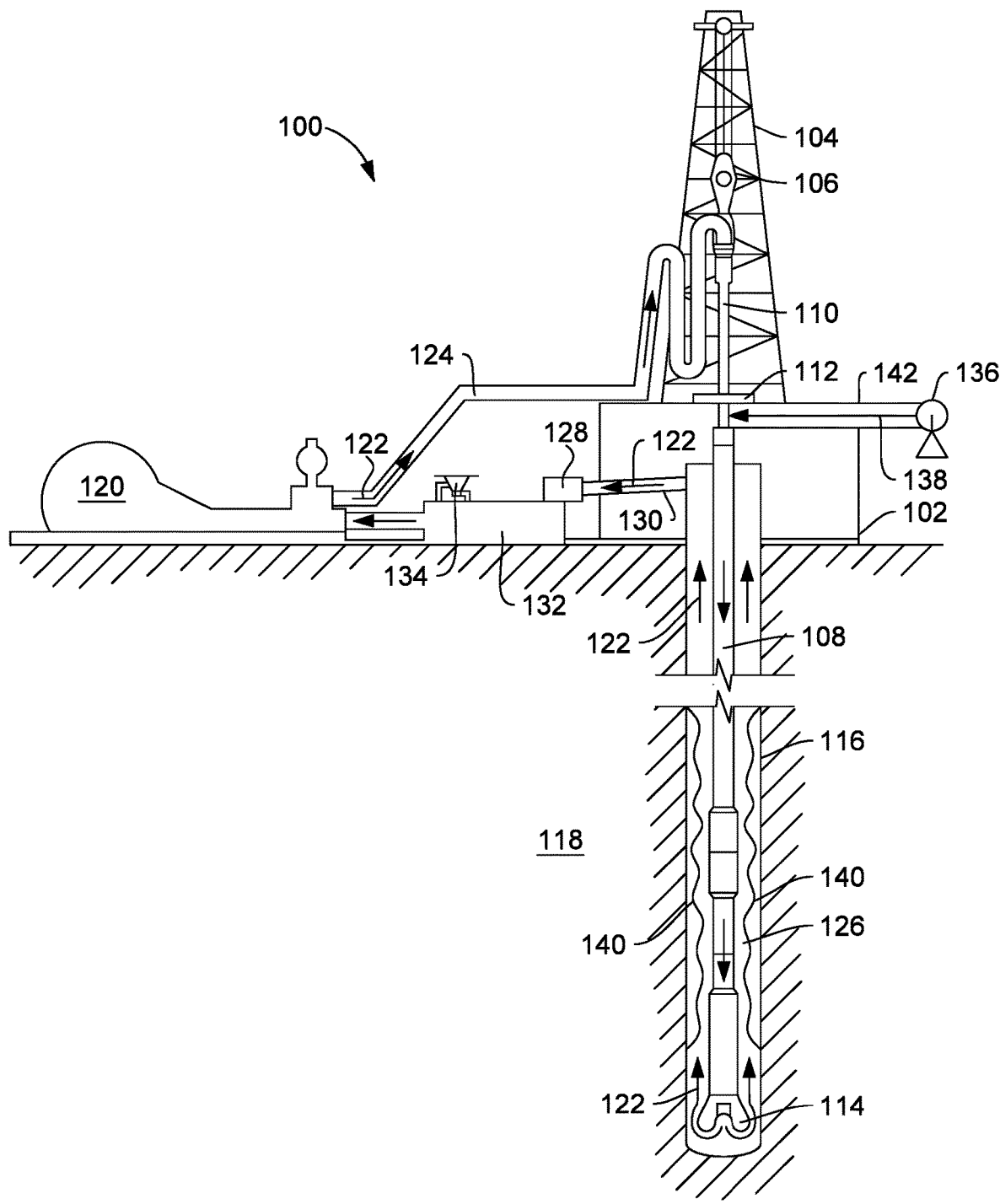

BREAKER ADDITIVES FOR EXTENDED DELAY IN REMOVAL OF OIL-BASED FILTER CAKES

BACKGROUND

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the well bore walls and prevent well blowouts. Specific drilling fluid systems are selected to optimize a drilling operation in accordance with the characteristics of a particular geological formation. "Drill-in" fluids are drilling fluids used for drilling through production zones. One type of drilling, fluid that may be used as a drill-in fluid may include an oil- or synthetic fluid-based muds. Unless indicated otherwise, the terms "oil mud" or "oil-based mud" or "drilling fluid" shall be understood to include drilling fluids that include synthetic oils or other synthetic fluids as well as natural or traditional oils. Oil-based drilling fluids used in drilling typically may include a base oil (or synthetic fluid) comprising the external phase of an invert emulsion; an aqueous fluid comprising the internal phase of the invert emulsion; emulsifiers at the interface of the internal and external phases; and other optional additives for suspension, weight or density, oil-wetting, fluid loss or filtration control, and/or rheology control.

During wellbore drilling operations, drilling fluids can form a filter cake on the wellbore face, thereby reducing the fluid loss into the formation. After completion of the drilling operations, and prior to production, the filter cake should be removed from the wellbore in order to maximize production. Inefficient removal of the filter cake may lead to decreased production rates. For filter cake removal, a breaker fluid may be pumped into the well to remove the filter cake from the wellbore face. These breaker fluids can be, for example, acid, chelating agents, oxidizers, enzyme treatments, or combinations thereof. A common disadvantage of any of these treatments is that the breaker fluids tend to be highly reactive and may remove or degrade the filter cake at the point of circulation before the treatment can be placed over the entire open hole interval. This problem may especially common with breaker fluids used to address the bridging particles used in drill-in fluids.

BRIEF DESCRIPTION OF THE DRAWINGS

These drawings illustrate certain aspects of some of the examples of the present disclosure and should not be used to limit or define the disclosure.

FIG. 1 is a schematic illustration of an example system for the preparation and delivery of delayed breaker fluid compositions to a wellbore.

DETAILED DESCRIPTION

The present disclosure is directed to filter cake removal and, more particularly, provides methods, compositions, and systems embodying a delayed breaker fluid for oil-based drill-in fluids. While the delayed breaker fluids may be useful for removal of a variety filter cakes, they may be particularly useful for removal of oil-based filter cakes from production zones. As used herein, the term "oil-based filter cake" refers to a filter cakes deposited in a wellbore by an oil-based (invert emulsion) drilling fluid having a base oil as the external phase.

The delayed breaker fluid may comprise an aqueous base fluid, an ester-based breaker, a carbodiimide. The delayed breaker fluid may be placed into a wellbore and provide for a time delayed removal of a filter cake from the wellbore. The acid precursor may provide a delayed release of an acid for degradation of the filter cake in the wellbore. By inclusion of the carbodiimide in the delayed breaker fluid, degradation of the filter cake may be further delayed. It may be desirable to delay degradation of the filter cake for a number of reasons, including, but not limited to: allowing placement of the delayed breaker fluid over a longer interval; allowing for even removal of the filter cake, and thus avoiding hotspots or wormholes; allowing safe time to pull the wash pipe placing the breaker past the isolation valve so that hydrostatic pressure is maintained; and to reduce the amount of time tubulars are exposed to acid or to allow time for new tools to be placed before the filter cake is removed. While not being limited by theory, it is believed that the carbodiimide delays hydrolysis of the acid precursor, thus delaying release of the acid.

Generally, delayed breaker fluids for oil-based filter cakes have used a polymeric viscosifier (e.g., hydroxyethyl cellulose) for delay. The viscosifier primarily aids in the delay through diffusion, in that a higher viscosity fluid prevents water from easily hydrolyzing the acid precursor, which may be an ester. However, the disclosed delayed breaker fluids may not comprise polymeric viscosifiers for various reasons. For example, the polymeric viscosifiers may be unreliable at elevated temperatures present in a subterranean environment or the polymeric viscosifiers may be undesirable for certain pumping operations requiring a breaker with low viscosity. More specifically, the disclosed delayed breaker fluids may comprise a polymeric viscosifier in an amount less than 0.01 percent by volume. Alternatively, the disclosed delayed breaker fluids may comprise a polymeric viscosifier in an amount from 0.0% to less than 0.01% by volume. Hence, the disclosed delayed breaker fluids may be considered essentially free of polymeric viscosifiers. Conversely, some embodiments of the disclosed delayed breaker fluids may not be considered essentially free of polymeric viscosifiers, as they may comprise a polymeric viscosifier in an amount greater than 0.01% by volume.

The aqueous base fluid utilized in the delayed breaker fluids may include any of a variety of aqueous fluids suitable for use in subterranean applications. More specifically, the aqueous fluid may comprise fresh water, saltwater (e.g., water containing one or more salts dissolved therein), or seawater. Suitable saltwater may include a brine, such as a sodium chloride brine, a sodium bromide brine, a calcium chloride brine, a calcium bromide brine, a zinc bromide brine, a sodium formate brine, a potassium formate brine, and combinations thereof. Generally, the aqueous fluid can be from any source that does not contain an excess of compounds that may undesirably affect other components in the delayed breaker fluid. Generally, the aqueous fluid may be present in an amount sufficient to form a pumpable delayed breaker fluid. More particularly, the aqueous fluid typically may be present in the delayed breaker fluids in an amount up to about 99.99% by volume of the delayed breaker fluid. By way of example, the aqueous fluid may be present in the delayed breaker fluids in an amount of about 50% to about 99% by volume. Alternatively, the aqueous fluid may be present in the delayed breaker fluids in an amount of about 50% to about 99% by volume, about 60% to about 90%, or about 70% to about 80% by volume.

The acid precursor is defined herein as a material or combination of materials that provides for a delayed release of one or more acids into the delayed release fluid. By way of example, the acid precursor may provide for a delayed release of one or more of lactic acid, formic acid, acetic acid, or combinations thereof. Suitable acid precursors may include lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly(ε-caprolactones); poly(hydroxybutyrates); poly(anhydrides); aliphatic polycarbonates; poly (amino acids); and polyphosphazenes; or copolymers thereof; poly(ortho esters); orthoesters (which may also be known as "poly ortho ethers" or "ortho ethers"); esters of oxalic acid; aliphatic polyesters; poly(lactides); poly(glycolides); poly(εcaprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or combinations thereof. Other suitable acid precursors may include halide esters and esters of acids such as esters of nitric, acid, sulphuric, acid, sulphonic acid, sulphinic acid, phosphoric acid, phosphorous acid, phosphonic acid, phosphinic acid, sulphamic acid and the like.

The acid precursor may react with water (e.g., hydrolyze), generate acid, and subsequently dissolve acid-soluble components of the filter cake, thereby facilitating removal of the filter cake from the wellbore. The acid precursor may be included in the delayed breaker fluid in any suitable amount for degradation of the filter cake. For example, the acid precursor may be included in an amount of about 5% to about 25% by volume of the delayed breaker fluid. Alternatively, the acid precursor may be present in an amount of about 5% to about 25% by volume, about 6% to about 24%, about 8% to about 22%, or about 10% to about 20% by volume of the delayed breaker fluid.

The carbodiimide may be added to the delayed breaker fluid as a hydrolysis inhibitor, thereby enhancing the stability of the acid precursor. Premature hydrolysis may result in an undesirable release of the acid before placement of the delayed breaker fluid at a desired location in the wellbore or before other well-bore operations can be completed, such as removing the wash pipe. However, as disclosed herein, the addition of the carbodiimide provides a method for enhancing the stability of the acid precursor. It is believed that this enhancement occurs due to the reduction of hydrolysis, thereby allowing for greater application of the acid precursor in higher temperature environments or when extended delays are needed to complete well-bore operations, with greater delay of the acid's release.

While not being limited by theory, the carbodiimide carbon is believed to be more reactive than the carbonyl carbon of an ester; hence the reaction of the carbodiimide with water or hydroxide prevents or inhibits the carbonyl carbon of the acid precursor (e.g., for ester-based acid precursors) from reacting with the water or hydroxide that might otherwise hydrolyze the acid precursor, thereby resulting in the acid precursor not becoming hydrolyzed. This is particularly significant in the delayed breaker fluid because such fluids already contain water as part of their composition. The carbodiimide is able to maintain effectiveness in enhancing the stability of the acid precursor.

Suitable carbodiimides may include, but are not limited to, carbodiimide monomers and polycarbodiimides. Examples of suitable carbodiimide monomers may include dialkyl-, diaryl-, diallyl-carbodiimides, 1-ethyl-3-(3-dimethylaminopropyl)carbodiimide (EDCI), N,N'-dicyclohexylcarbodiimide (DCC), N,N'-diisopropylcarbodiimide (DIC), and bis(2,6-diisopropylphenyl)carbodiimide. Polymers of these specific monomeric carbodiimides may also be suitable. The carbodiimide may be present in the delayed breaker fluids in any suitable amount. For example, the carbodiimide may be present in the delayed breaker fluid in an amount of about 0.1% to about 5% by volume of the delayed breaker fluid. Alternatively, the carbodiimide may be present in an amount of about 0.1% to about 5%, about 0.5% to about 4%, or about 1% to about 3% by volume of the delayed breaker fluid.

Suitable polycarbodiimides may include, but are not limited to, polycarbodiimides that are reaction products of substituted aromatic isocyanates, such as: 2,6-diisopropylphenyl isocyanate; 1,3,5-triisopropyl-2,4-diisocyanatobenzene; naphthalene-1,5-diisocyanate; 2,4-diissocyanato-3,5-dimethyltoluene; 4,4'-methylenebis(2,6-diethylphenyl isocyanate); 4,4'-methylenebis(2-ethyl-6-methylphenyl isocyanate); 4,4'-methylenebis(2,6-isopropyl-6-methylphenyl isocyanate); 4,4'-methylenebis(2,6-diisopropylphenyl isocyanate); and 4,4'-methylenebis(2-ethyl-6-methylcyclohexyl isocyanate). The polycarbodiimides may be present in the delayed breaker fluids in any suitable amount. For example, the polycarbodiimides may be present in the delayed breaker fluid in an amount of about 0.1% to about 5% by volume of the delayed breaker fluid. Alternatively, the polycarbodiimides may be present in an amount of about 0.1% to about 5%, about 0.5% to about 4%, or about 1% to about 3% by volume of the delayed breaker fluid.

Optionally a wetting agent, in the form of one or more surfactants, may be included in the delayed breaker fluid, for example, to improve the compatibility of delayed breaker fluid with other fluids. It should be noted that some processes may use mutual solvents. However, in the cleanup of filter cakes drilled with oil-based materials, the filter cake bridging materials that need to be removed are oil-wet. In such instances, there may be residual oil in the filter cake as well. Acid precursor breakers may be placed into a brine, wherein these materials and components may not be compatible with the oil-wet filter cake. This incompatibility may hinder, or possibly prevent the acid of the breaker from completely reacting with the oil-wet bridging materials in the filter cake. In order to overcome this problem, mutual solvents may be incorporated into the breaker formulation. Mutual solvents work by solvating both water-based material and oil. Typically, they may be present in high concentrations, generally 10-20% of the breaker concentration, wherein such high concentrations may severely limit the density of the breaker, indirectly, mutual solvents may aid in the removal of the oil-wet bridging materials as they help solubilize oils present and remove them from the surface of the bridging materials. However, oil-based filter cakes also comprise oil-wetting surfactants that are not necessarily removed by mutual solvents.

Conversely, a breaker may be formulated with a water-wetting surfactant. Generally, water-wetting surfactants are more efficient than mutual solvents, whereby they may often be used in volumes of less than 2%, or less than 1%. Other benefits of using a water-wetting surfactant in lieu of mutual solvents including, but not limited to, addressing the acid attack on the oil-wet filter cake bridging materials more directly by displacing oil-wetting surfactants and rendering the surface of the bridging materials water-wet. Once water-wet, the surfaces may be more easily accessible and attacked by aqueous-based acids, such as the breakdown products of the breaker fluids disclosed herein. Therefore, the use of water-wetting surfactants is an improvement over the use of mutual solvents for the methods, systems, and compositions disclosed herein.

Examples of suitable wetting agents for the delayed breaker fluid may include, but are not limited to: 2 ethyl hexanol, polymeric nonionic surfactant, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and mixtures thereof.

Suitable wetting agents may be used in a liquid or powder form. The wetting agents may be included in the delayed breaker fluid in an amount suitable for a particular application. For example, where liquid wetting agents are used, the wetting agents may be present in an amount of from about 0.01% to about 5.0% by volume of the delayed breaker fluid. In specific examples, liquid wetting agents may be present in an amount of about 0.02% to about 4%, about 0.03% to about 3%, about 0.04 to about 2%, or about 0.05% to about 1% by volume of delayed breaker fluid. By way of further example, where powdered wetting agents are used, the wetting agents may be present in an amount of from about 0.001% to about 0.5% by weight of the delayed breaker fluid. In specific examples, powdered wetting agents may be present in an amount of from about 0.001% to about 0.5% by weight of the delayed breaker fluid, from 0.01% to about 0.4% by weight of the delayed breaker fluid, or from about 0.1% to about 0.3% by weight of the delayed breaker fluid.

In certain embodiments, the delayed breaker fluids may also comprise any additional additives that may be suitable for use in a particular application, including, but not limited to, any of the following: corrosion inhibitors, hydrate inhibitors, clay stabilizers, bactericides, salt substitutes (such as tetramethyl ammonium chloride), relative permeability modifiers, sulfide scavengers, fibers, nanoparticles, pH control additives, fluid loss control additives, scale inhibitors, asphaltene inhibitors, paraffin inhibitors, salts, foamers, defoamers, emulsifiers, demulsifiers, iron control agents, solvents, mutual solvents, particulate diverters, gas phase, carbon dioxide, nitrogen, friction reducers, friction boosters, combinations thereof, or the like. The filter cake clean-up fluids of the present invention also may include other additives that may be suitable for a given application, as will be recognized by a person of ordinary skill in the art, with the benefit of this disclosure.

The delayed breaker fluids may be prepared in accordance with any suitable technique. For example, the components of the delayed breaker fluids (e.g., aqueous fluid, carbodiimide, acid precursor, optional additives, etc.) may be combined using any mixing device compatible with the delayed breaker fluids. In some embodiments, the components of the delayed breaker fluids may be combined at the well site; alternatively, the components of the delayed breaker fluids may be combined offsite and are transported to and used at the well site. The contacting of the components of the delayed breaker fluids may initiate hydrolysis of the acid precursor by the aqueous fluid, for example.

In some embodiments, the filter cakes to which the delayed breaker fluids may be applied comprise bridging agents that include, but are not limited to, calcium carbonate, sized marble, magnesium carbonate, iron carbonate, ilmenite, hematite, sized sodium chloride, and the hydrates thereof. Generally, the bridging agent particle size may range from about 1 micron to about 600 microns but may vary from formation to formation. Alternatively, the bridging agent particle sizes may range from about 1 micron to about 600 microns, from about 3 microns to about 500 microns, from about 5 microns to about 200 microns, from about 5 microns to about 150 microns, or from about 10 microns to about 100 microns. The particle size used may be determined by the pore throat size of the formation. The filter cake may also comprise a variety of fluid loss control agents including, but not limited to, starch, starch ether derivatives, hydroxyethylcellulose, cross-linked hydroxyethylcellulose, polystyrene and polystyrene derivatives, polyethylene, polypropylene, polyester, poly acrylamide and poly acrylamide derivatives, lignite, modified lignite, lignin, gilsonite, asphalt, and mixtures thereof. The filter cakes may also contain a hydratable polymer solid suspending agent. A variety of hydratable polymer solid suspending agents may be present in the filter cake, including but not limited to, biopolymers such as xanthan and succinoglycan, cellulose derivatives such as hydroxyethylcellulose and guar and its derivatives such as hydroxypropyl guar.

In some embodiments, the filter cakes may be considered oil-based filter cakes. As previously described, an oil-based filer cake refers to a filter cakes deposited in a wellbore by an oil-based (invert emulsion) drilling fluid having a base oil as the external phase. Examples of base oils may include, but are not limited to, olefins, kerosene, diesel oil, fuel oil, synthetic oils, linear or branched paraffins, olefins, esters, acetals, mixtures of crude oil, tall oil fatty acid, modified tall oil, oxidized tall oil, fatty amids, lecethin, fatty esters, fatty alcohols and combinations and derivatives thereof. However, it should be understood that the delayed breaker fluids may be used to facilitate removal of other filter cakes, such as water-based filter cakes.

In some embodiments, introduction of a drilling fluid (e.g., an oil-based drilling fluid) into a wellbore may result in deposition of a filter cake. The filer cake may be deposited along a wall of a wellbore, in a subterranean formation. While the filter cake may be deposited at different locations in the wellbore, the filer cake may be deposited in a production zone. To facilitate degradation of the filter cake, for example, the delayed breaker fluid may be introduced into the wellbore. The delayed breaker fluid may include an aqueous fluid, a brine-soluble weak base, and an acid precursor. The delayed breaker fluid may also include one or more additional additives described herein, such as wetting agents. In some embodiments, the delayed release fluid may be spotted as a pill, which is a relatively small volume of fluid. As previously described, the acid precursor may hydrolyze in the delayed breaker fluid. However, the delayed breaker fluid may be designed to slowly release the acid within the wellbore. For example, inclusion of the brine-soluble weak base May delay the acid, for example, so that the delayed breaker fluid not be as acidic until a desired placement. The delay may allow for efficient removal of the filter cake and reduce formation damage by allowing the delayed breaker fluid to be more evenly distributed in the wellbore. In the wellbore, the method may include contacting a filter cake (e.g., oil-based filter cake) with the delayed breaker fluid. For example, the acid produced in the delayed breaker fluid may degrade acid-soluble components of the filter cake, facilitating removal of the filter cake. The resident time in the wellbore for removal of the filter cake can vary, for example, based the acid produced, temperature, and composition of the filter cake, among others. An average resident time may range, for example, from 8 hours to 24 hours. Completion equipment may be introduced into the wellbore during this residence time. To recover the delayed breaker fluid, hydrostatic pressure may be decreased.

An example method or technique of using the delayed breaker fluids in a subterranean formation will now be described in more detail with reference to FIG. 1. The delayed breaker fluids disclosed herein may directly or indirectly affect one or more components or pieces of equipment associated with the preparation, delivery, recapture, recycling, reuse, and/or disposal of the disclosed fluids, including the delayed breaker fluids. For example, referring to FIG. 1, the delayed breaker fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the an will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven, either by a downhole motor and/or via rotation of the drill string 108, from the well surface. As the bit 114 rotates, it creates a borehole 116 that penetrates various subterranean formations 118.

A pump 120 (e.g., a mud pump) circulates drilling fluid 122 through a feed pipe 124 to the kelly 110, which conveys the drilling fluid 122 downhole through the interior of the drill string 108 and through one or more orifices in the drill bit 114. The drilling fluid 122 may then be circulated back to the surface via an annulus 126, defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, the disclosed fluids may be added to the drilling fluid 122 at any other location in the drilling assembly 100. In at least one embodiment, for example, there may be more than one retention pit 132, such as multiple retention pits 132 in series. Moreover, the retention pit 132 may be representative of one or more fluid storage facilities and/or units where the disclosed fluids may be stored, reconditioned, and/or regulated until added to the drilling fluid 122.

In some embodiments, a pump 136 circulates the delayed breaker fluids 138 through a feed pipe 142 to the kelly 110, which conveys the delayed breaker fluids 138 downhole through the interior of the drill string 108 and through one or more orifices in the drill bit 114, contacting, then degrading the filter cake 140. The delayed breaker fluids 138 may then be circulated back to the surface via an annulus 126, defined between the drill string 108 and the walls of the borehole 116, wherein the delayed breaker fluids 138 contact, saturate, and flow through, and ultimately degrade the filter cake 140. As mentioned above, the disclosed the delayed breaker fluids 138 may directly or indirectly affect the components and equipment of the drilling assembly 100. For example, the disclosed the delayed breaker fluids 138 may directly or indirectly affect the fluid processing unit(s) 128, which may include, but not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the exemplary fluids.

The disclosed fluids, including the delayed breaker fluids 138 may also directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids, including the delayed breaker fluids 138, may also directly or indirectly affect the mixing hopper 134 and the retention pit 132 and their assorted variations.

The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids may also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

The systems, methods, and compositions may include any of the various features disclosed herein, including one or more of the following statements.

Statement 1. A wellbore treatment method may comprise introducing a delayed breaker fluid into a wellbore, wherein the delayed breaker fluid comprises an aqueous base fluid, an acid precursor, and a carbodiimide. The wellbore treatment method may further comprises contacting a filter cake in the wellbore with the delayed breaker fluid such that the filter cake is at least partially degraded by acid released from the acid precursor.

Statement 2. The method of statement 1, wherein the delayed breaker fluid further comprises a wetting-agent.

Statement 3. The method of statement 2, wherein the wetting-agent comprises a surfactant.

Statement 4. The method of statement 2 or 3, wherein the wetting-agent is present in an amount of about 0.02% to about 4% by volume of the delayed breaker fluid.

Statement 5. The method of any preceding statement, wherein the delayed breaker fluid is essentially free of polymeric viscosifiers.

Statement 6. The method of any preceding statement, wherein the carbodiimide comprises at least one carbodiimide selected from the group consisting of a carbodiimide monomer, a polycarbodiimide, and combinations thereof.

Statement 7. The method of any preceding statement, wherein the carbodiimide comprises at least one carbodiimide monomer selected from the group consisting of dialkyl-, diaryl-, diallyl-carbodiimides, 1-ethyl-3-(3-dimethylaminopropyl)carbodiimide (EDCI), N,N'-dicyclohexylcarbodiimide (DCC), N,N'-diisopropylcarbodiimide (DIC), and bis(2,6-diisopropylphenyl)carbodiimide, and combinations thereof.

Statement 8. The method of any preceding statement, wherein the carbodiimide is present in an amount of about 0.1% to about 5% by volume of the delayed breaker fluid.

Statement 9. The method of any preceding statement, wherein the aqueous base fluid comprises at least one fluid selected from the group consisting of fresh water, saltwater, seawater, and combinations thereof.

Statement 10 The method of any preceding statement, wherein the aqueous base fluid is present in an amount of about 50% to about 99% by volume of the delayed breaker fluid.

Statement 11. The method of any preceding statement, wherein the acid precursor is present in an amount of about 5% to about 25% by volume of the delayed breaker fluid.

Statement 12. The method of any preceding statement, wherein the acid precursor comprises an ester-based acid precursor.

Statement 13. A wellbore treatment method may comprise introducing a delayed breaker fluid into a wellbore, wherein the delayed breaker fluid comprises a brine, an ester-based breaker, a carbodiimide, and a wetting agent. The wellbore treatment method may further comprise contacting an oil-based filter cake in the wellbore with the delayed breaker fluid. The wellbore treatment method may further comprise degrading the oil-based filter cake with acid released from the ester-based breaker.

Statement 14. The method of statement 13 wherein the delayed breaker fluid is essentially free of polymeric viscosifiers.

Statement 15. The method of statement 13 or 14 wherein the ester-based breaker is present in an amount of about 5% to about 25% by volume of the delayed breaker fluid.

Statement 16. The method of any one of statements 13 to 15 wherein the carbodiimide is present in an amount of about 0.1% to about 5% by volume of the delayed breaker fluid.

Statement 17. A delayed breaker fluid may comprise an aqueous fluid, an acid precursor; and a carbodiimide.

Statement 18. The delayed breaker fluid of statement 17, further comprising a wetting agent, wherein the wetting agent comprises one or more surfactants.

Statement 19. The delayed breaker fluid of statement 17 or 18, wherein the delayed breaker fluid is essentially free of polymeric viscosifiers.

Statement 20. The delayed breaker fluid of any one of statements 17 to 19, wherein the carbodiimide comprises at least one carbodiimide selected from the group consisting of a carbodiimide monomer, a polycarbodiimide, and combinations thereof.

To facilitate a better understanding of the present disclosure, the following examples of some of the preferred examples are given. In no way should such examples be read to limit, or to define, the scope of the disclosure.

Examples

This example was performed to analyze different breaker fluids. Breakthrough testing was performed by first building a filter cake at 250° F. (121° C.) and 500 PSI (3.4×10$^6$ Pa) differential pressure for 4 hours using an oil-based drill-in fluid on an aloxite filter disk in a high temperature-high pressure ("HTHP") fluid loss test cell. Table 1 provides the composition of the oil-based drill-in fluid.

TABLE 1

| PRODUCT | AMOUNT |
| --- | --- |
| Base oil, bbl (m$^3$) | 0.5 (0.06) |
| Emulsifier, lb/bbl (kg/m$^3$) | 14 (40) |
| Lime, lb/bbl (kg/m$^3$) | 4 (11.4) |
| Freshwater, bbl (m$^3$) | 0.1 (0.01) |
| 11.3 ppg CaCl2 brine, bbl (m$^3$) | 0.14 (0.02) |
| Fluid loss control agent, lb/bbl (kg/m$^3$) | 2 (5.7) |
| Rheology modifier, lb/bbl (kg/m$^3$) | 10 (28.5) |
| Suspension aid, lb/bbl (kg/m$^3$) | 2 (5.7) |
| Ground Marble 5 micron, lb/bbl (kg/m$^3$) | 20 (57.06) |
| Ground Marble 50 micron, lb/bbl (kg/m$^3$) | 60 (171.2) |
| API Barite, lb/bbl (kg/m$^3$) | 153 (436.5) |

Table 1 presents a summary of the breakthrough tests and breaker fluids used for the breakthrough experiment. After 4 hours, the HTHP fluid loss cell was cooled and the remaining drill-in fluid poured from the cell. The breaker fluids of known amount were then added onto the filter cake inside the HTHP fluid loss cell, which was then reassembled and the temperature was increased to the temperature of the previous filter cake testing, with a 100 PSI (689,476 Pa) pressure differential. Breakthrough was monitored by measuring the weight of filtrate from the HTHP fluid loss cell versus time. Generally, breakthrough occurs instantaneously when a significant volume of breaker is released quickly, as opposed to the slow leak-off of the filtration fluids. Breakthrough time was determined by the amount of time when the initial breaker fluid was measured at a vastly accelerated rate.

The comparative breaker fluid (Formulation A) included a viscosifier, hydroxyethyl cellulose "HEC"). The comparative breaker fluid showed a breakthrough time of 7 hours with a 93% removal of filter cake. Using the same breaker fluid, another comparative breaker fluid (Formulation B) was tested with sodium bicarbonate in place of the HEC. Formulation B resulted in a breakthrough time of approximately 3.2 hours with a 95% removal of filter cake. Formulation C, comprising a carbodiimide in place of HEC, resulted in a breakthrough time of 11 hours, which exceeds the breakthrough time of any other formulation. Formulation C also removed 90% of the filter cake. Filter cake breaking was also tested without the addition of a viscosifier or carbodiimide (Formulation D), which resulted a breakthrough time of only 1.5 hours; thereby, proving the effect of having a carbodiimide in the system aids in the breaking of the cake. Formulation D also had a 96% removal of the filter cake.

TABLE 2

|  | A | B | C | D |
|---|---|---|---|---|
| NaBr, lb/bbl (kg/m$^3$) | 283 (807) | 283 (807) | 283 (807) | 283 (807) |
| Lactic acid precursor, % vol | 17 | 17 | 17 | 17 |
| Surfactant % vol | 2 | 2 | 2 | 2 |
| HEC, lb/bbl (kg/m$^3$) (baseline) | 0.3 (0.9) | | | |
| Sodium bicarbonate, lb/bbl (kg/m$^3$) | | 3 (8.6) | | |
| Carbodiimide, lb/bbl (kg/m$^3$) | | | 1.0 (2.85) | |
| Baseline without HEC | | | | 0 |
| Breakthrough time, h | 7 | 3.2 | 11 | 1.5 |
| Removal soluble acid, % | 93 | 95 | 90 | 96 |

The experimental procedure used to determine the breakthrough time was the Filter Cake Breaker Fluid Test (WM-GL-HAL-BAR-LAB-TES-036), in accordance with API 13B2 recommended practice for field testing of oil-based drilling fluids standards and procedures. The term "breakthrough" describes reservoir conditions under which a completion fluid, separated from a formation by a filter cake, gains significant access to said formation as a result of the degradation of the filter cake. As used herein, the term "breakthrough time" refers to the elapsed time between the initial contact of a wellbore analyte with a reactive filter cake breaker and the time at which the filter cake can no longer retain additional wellbore analyte.

The experimental procedure used to calculate the removal percentage of acid soluble materials was as follows: First the OBM filter cake was soaked in the breaker fluid at 250° F. for 72 h (100 psi). The breaker fluid was then removed by decanting and then a known amount of the filter cake (3.0 g) was taken. The filter cake was then transferred to a conical tube and then 20 ml of ethanol was then added. The mixture was then centrifuged at 3000 rpm for 5 min and the liquid was removed. After this, the filter cake was transferred to a beaker and then dried in the oven overnight. After drying, the filter cake sample was then reweighed, and the weight was taken as the initial weight of the sample. Dissolution testing was completed by adding a known volume of 15% HCl to the filter cake. The HCl acid was allowed to react for 4 h and then the liquid was removed. The sample was then dried in the oven overnight, and the final weight was determined thereafter. The Removal Soluble Acid (%) was determined using the formula:

$$\text{Removal Soluble Acid}(\%) = 100 - \left(\frac{\text{Initial wt of filter cake} - \text{final wt of filter cake}}{\text{Initial wt of filter cake}} \times 100\right)$$

For the purposes disclosed herein, the removal soluble acid percent refers to the total amount of acid cleaned by the disclosed composition. The experimental results indicate that the composition disclosed herein cleans from about 93% or more of acid-soluble compounds.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:
1. A wellbore treatment method comprising:
    introducing a delayed breaker fluid into a wellbore, wherein the delayed breaker fluid comprises an aqueous base fluid, an acid precursor, and a carbodiimide, wherein the carbodiimide is present in an amount of about 1 to about 3 pounds per barrel of the delayed breaker fluid; and contacting an oil-based filter cake in the wellbore with the delayed breaker fluid such that the oil-based filter cake is at least partially degraded by acid released from the acid precursor.

2. The method of claim 1, wherein the delayed breaker fluid further comprises a wetting-agent.

3. The method of claim 2, wherein the wetting-agent comprises a surfactant.

4. The method of claim 2, wherein the wetting-agent is present in an amount of about 0.02% to about 4% by volume of the delayed breaker fluid.

5. The method of claim 1, wherein the delayed breaker fluid is essentially free of polymeric viscosifiers.

6. The method of claim 1, wherein the carbodiimide comprises at least one carbodiimide selected from the group consisting of a carbodiimide monomer, a polycarbodiimide, and combinations thereof.

7. The method of claim 1, wherein the carbodiimide comprises at least one carbodiimide monomer selected from the group consisting of dialkyl-, diaryl-, diallyl-carbodiimides, 1-ethyl-3-(3-dimethylaminopropyl)carbodiimide (EDCI), N,N'-dicyclohexylcarbodiimide (DCC), N,N'-diisopropylcarbodiimide (DIC), and bis(2,6-diisopropylphenyl)carbodiimide, and combinations thereof.

8. The method of claim 1, wherein the aqueous base fluid comprises at least one fluid selected from the group consisting of fresh water, saltwater, seawater, and combinations thereof.

9. The method of claim 1, wherein the aqueous base fluid is present in an amount of about 50% to about 99% by volume of the delayed breaker fluid.

10. The method of claim 1, wherein the acid precursor is present in an amount of about 5% to about 25% by volume of the delayed breaker fluid.

11. The method of claim 1, wherein the acid precursor comprises an ester-based acid precursor.

12. A wellbore treatment method comprising:
introducing a delayed breaker fluid into a wellbore, wherein the delayed breaker fluid comprises a brine; an ester-based breaker; a carbodiimide, wherein the carbodiimide is present in an amount of about 1 to about 3 pounds per barrel of the delayed breaker fluid; and a wetting agent;
contacting an oil-based filter cake in the wellbore with the delayed breaker fluid; and
degrading the oil-based filter cake with acid released from the ester-based breaker.

13. The method of claim 12, wherein the delayed breaker fluid is essentially free of polymeric viscosifiers.

14. The method of claim 12, wherein the ester-based breaker is present in an amount of about 5% to about 25% by volume of the delayed breaker fluid.

15. The method of claim 12, wherein the carbodiimide comprises at least one carbodiimide selected from the group consisting of a carbodiimide monomer, a polycarbodiimide, and combinations thereof.

16. The method of claim 12, wherein the carbodiimide comprises at least one carbodiimide monomer selected from the group consisting of dialkyl-, diaryl-, diallyl-carbodiimides, 1-ethyl-3-(3-dimethylaminopropyl)carbodiimide (EDCI), N,N'-dicyclohexylcarbodiimide (DCC), N,N'-diisopropylcarbodiimide (DIC), and bis(2,6-diisopropylphenyl)carbodiimide, and combinations thereof.

17. The method of claim 12, wherein the wetting-agent is present in an amount of about 0.02% to about 4% by volume of the delayed breaker fluid.

18. The method of claim 12, wherein the aqueous base fluid is present in an amount of about 50% to about 99% by volume of the delayed breaker fluid.

* * * * *